(12) United States Patent
Shah et al.

(10) Patent No.: US 7,575,650 B1
(45) Date of Patent: Aug. 18, 2009

(54) END GAPS OF FILLED HONEYCOMB

(75) Inventors: Chandrakant Himatlal Shah, Burbank, CA (US); Tod Palm, Manhattan Beach, CA (US); Timothy Alan Dyer, Garden Grove, CA (US); Carl A. Reis, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 351 days.

(21) Appl. No.: 11/166,323

(22) Filed: Jun. 24, 2005

Related U.S. Application Data

(62) Division of application No. 10/461,178, filed on Jun. 12, 2003, now Pat. No. 7,048,986.

(51) Int. Cl.
*B32B 37/00* (2006.01)

(52) U.S. Cl. .......................... 156/78; 156/79; 156/290; 156/292

(58) Field of Classification Search .................. 428/117, 428/118; 156/78
See application file for complete search history.

(56) References Cited

U.S. PATENT DOCUMENTS

| | | | |
|---|---|---|---|
| 3,970,324 A | 7/1976 | Howat | |
| 4,061,812 A | 12/1977 | Gilwee, Jr. et al. | |
| 4,335,174 A | 6/1982 | Belko | |
| 4,453,367 A | 6/1984 | Geyer et al. | |
| 4,477,012 A | 10/1984 | Holland et al. | |
| 4,557,961 A * | 12/1985 | Gorges ....................... 428/117 |
| 5,338,594 A | 8/1994 | Wang et al. | |
| 5,569,508 A | 10/1996 | Cundiff | |
| 5,776,579 A | 7/1998 | Jessup et al. | |
| 5,897,739 A | 4/1999 | Forster et al. | |
| 6,117,518 A | 9/2000 | Cawse et al. | |
| 6,235,370 B1 | 5/2001 | Merrill et al. | |
| 6,852,192 B2 | 2/2005 | Sato et al. | |

FOREIGN PATENT DOCUMENTS

| | | |
|---|---|---|
| EP | 0 628 406 | 12/1994 |
| GB | 1 269 244 | 4/1972 |

(Continued)

OTHER PUBLICATIONS

European Search Report issued for EP 04 25 1623, dated Oct. 28, 2004.

(Continued)

*Primary Examiner*—John L Goff
(74) *Attorney, Agent, or Firm*—Fulbright & Jaworski L.L.P.

(57) ABSTRACT

A sandwich panel includes a honeycomb core of a plurality of cells. A first skin is adhered to a first surface of the honeycomb core with an adhesive. A second skin is adhered to a second surface of the honeycomb core with the adhesive. The plurality of cells extend longitudinally between the first and second skins. The first and second skins adhere to the honeycomb core to form a sandwich panel having a surface area of at least 2.25 square feet. A foam fill is disposed within the cells of the honeycomb core. The foam fill and the honeycomb core define a first gap region proximate to the first skin and a second gap region proximate to the second skin.

9 Claims, 3 Drawing Sheets

FOREIGN PATENT DOCUMENTS

| | | |
|---|---|---|
| JP | 51-118215 | 9/1976 |
| JP | 57-108933 | 7/1982 |
| JP | 03-74936 | 7/1991 |
| JP | 07-233630 | 9/1995 |
| JP | 07-300913 | 11/1995 |
| JP | 09-295364 | 11/1997 |
| JP | 2000-141516 | 5/2000 |
| JP | 2003-181852 | 7/2003 |

OTHER PUBLICATIONS

Japanese Office Action (in English language) issued for related JP Application 2004-085127, dated Feb. 26, 2008, 9 pages.

Japanese Office Action (in English language) issued for related Japanese Application No. 2004-85127; dated Aug. 26, 2008; 5 Pages.

* cited by examiner

END GAPS OF FILLED HONEYCOMB

RELATED APPLICATIONS

This application is a Divisional of U.S. patent application Ser. No. 10/461,178, entitled "END GAPS OF FILLED HONEYCOMB," filed Jun. 12, 2003, now U.S. Pat. No. 7,048,986, the disclosure of which is hereby incorporated herein in its entirety.

TECHNICAL FIELD OF THE INVENTION

This invention relates generally to the field of sandwich panel structures, and more specifically to end gaps of partially filled honeycomb sandwich panels.

BACKGROUND OF THE INVENTION

Honeycomb sandwich panels are useful structural components providing increased strength and stiffness despite their minimal weight. Thus, honeycomb sandwich panels are useful in many applications, for example, the construction of aircraft and spacecraft. Typical honeycomb sandwich panels include a honeycomb core with multiple cells parallel to one another. Many different materials of varying weight densities, cell sizes, and shapes are available for use in honeycomb cores. A honeycomb core is sandwiched between two skin sheets to provide a stiffer design structure. Where cells within the honeycomb core are left hollow, a honeycomb sandwich panel typically demonstrates weak shear properties and reduced thermal conductivity. Although thermal conductivity may be improved by filling the cells with foam fill material, a foam filled honeycomb sandwich panel exhibits reduced flat-wise tensile strength. Accordingly, skin sheets are easily pulled away from the honeycomb core.

SUMMARY OF THE INVENTION

According to one embodiment of the present invention, a sandwich panel includes a honeycomb core of a plurality of cells. A first skin is adhered to a first surface of the honeycomb core with an adhesive. A second skin is adhered to a second surface of the honeycomb core with the adhesive. The plurality of cells extend longitudinally between the first and second skins. The first and second skins adhere to the honeycomb core to form a sandwich panel having a surface area of at least 2.25 square feet. A foam fill is disposed within the cells of the honeycomb core. The foam fill and the honeycomb core define a first gap region proximate to the first skin and a second gap region proximate to the second skin.

Some embodiments of the invention provide numerous technical advantages. Other embodiments may realize some, none, or all of these advantages. For example, according to one embodiment, honeycomb sandwich panels are partially filled to form gap regions at respective ends of each cell within the honeycomb sandwich panel. Gap regions enable adhesive to more readily adhere the skin sheets to the honeycomb core. A technical advantage of the partially filled honeycomb sandwich panel may include improved thermal properties. Thus, the partially foam filled honeycomb panel may act as an insulator during both low and high temperature applications. Other technical advantages of the partially filled honeycomb sandwich panel may include enhanced permeation barrier capability and reduced cryopumping in the honeycomb sandwich panel. A further technical advantage may include improved structural properties. In some embodiments, honeycomb sandwich panels that include gap regions retain tension strength and specifically, flat-wise tension strength. Accordingly, the skin sheets adhered to the honeycomb core are not easily separated from the honeycomb core when subjected to tension forces. In particular embodiments, the shear and compression strength of the honeycomb core that includes partially filled cells is increased.

Other advantages may be readily ascertainable by those skilled in the art from the following FIGURES, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, and which.

DETAILED DESCRIPTION OF EXAMPLE EMBODIMENTS OF THE INVENTION

Figure 1:
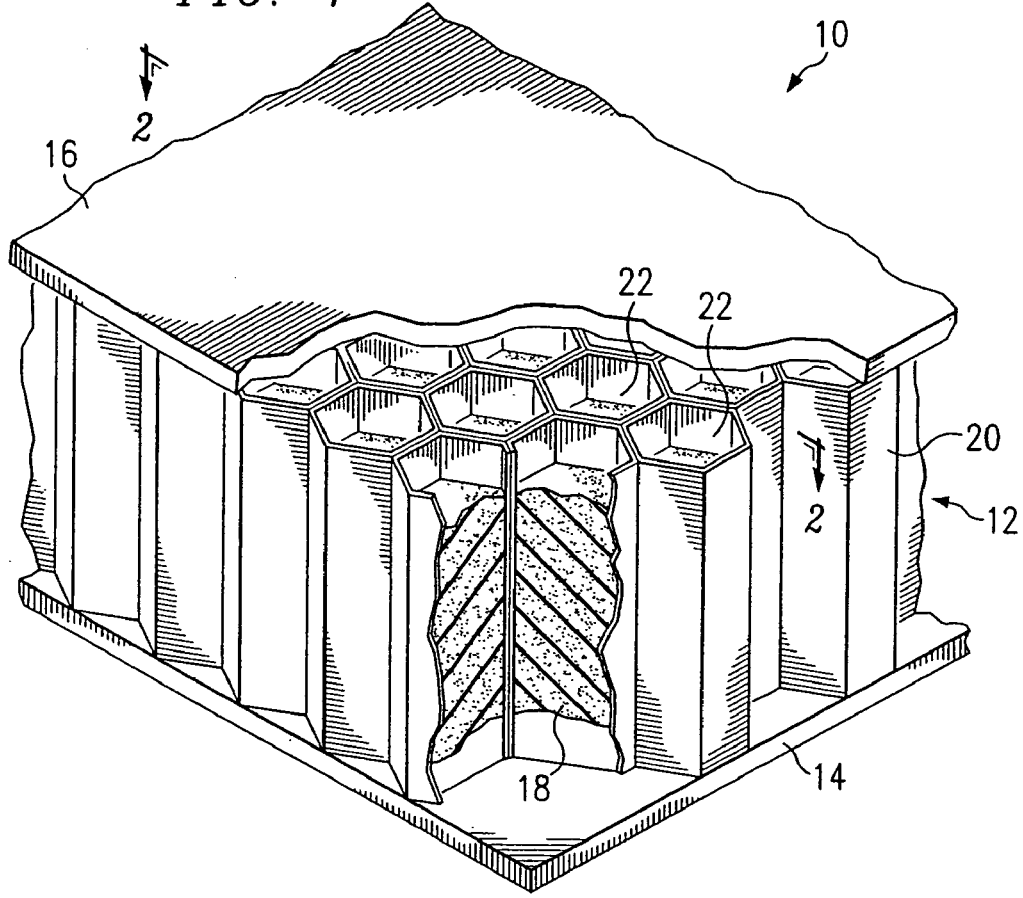
FIG. 1 is a schematic diagram illustrating a honeycomb sandwich panel with enhanced thermal and permeation-barrier properties and increased structural properties in accordance with one embodiment of the present invention.

FIG. 1 is a schematic diagram illustrating a honeycomb sandwich panel 10 with enhanced thermal and permeation-barrier properties and increased structural properties in accordance with one embodiment of the present invention. Honeycomb sandwich panel 10 includes a honeycomb core 12, a first skin 14, a second skin 16, and a foam fill 18. The honeycomb core 12 includes multiple cells 20 that are partially filled with foam fill 18 to form gap regions 22. Partially filled cells provide increased compressive, tensile, and shear strength to honeycomb sandwich panel 10.

The cells 20 are parallel tubes that extend longitudinally between the first skin 14 and the second skin 16. Typical honeycomb sandwich panels 10 include honeycomb cells 20 of a hexagonal or square shape; however other shapes may be utilized. In particular embodiments, the cells 20 are approximately a quarter-inch in diameter. However, the honeycomb cells 20 may be of any diameter and shape appropriate for the application in which the honeycomb sandwich panel 10 is used. Additionally, the honeycomb cells 20 may be of any appropriate longitudinal length exhibiting thermal and structural properties suitable for the particular application in which honeycomb sandwich panel 10 is to be used. Honeycomb core 12 may comprise any of many known materials having a variety of weights and densities. Honeycomb core 12 is typically constructed of fiber and resin composite or metal composite. For example, honeycomb core 12 materials may include aluminum, titanium, or other metal suitable for constructing honeycomb core 12 or any composite thereof. Common composite materials suitable for constructing honeycomb core 12 include Nomax and Kevlar.

The first and second skins 14 and 16 may also comprise a composite material. The material used in the first and second face sheets 14 and 16 may be dependent upon the material of the honeycomb core 12 or the foam fill 18. For example, if the honeycomb core 14 is made of aluminum, first and second skins 14 and 16 may also be made of aluminum, an aluminum composite, or another composite compatible with an aluminum core 12. As will be described in greater detail below, first and second skins 14 and 16 are adhered to opposite sides of honeycomb core 12, respectively. When adhered to honeycomb core 12, first and second skins 14 and 16 act to seal off both ends, respectively, of each cell 20 and also improve the strength and stiffness of honeycomb sandwich panel 10. In particular embodiments, honeycomb sandwich panel 10 has a surface area of at least 2.25 square feet. Although any suitable size of honeycomb sandwich panel 10 may be used, a honeycomb sandwich panel 10 having a surface area of 2.25 square feet or above may be particularly suitable for commercial and/or industrial purposes.

Foam fill 18 is disposed within the cells 20 of the honeycomb core 12 and increases the thermal properties of the honeycomb sandwich panel 10. Thermal properties are enhanced because the foam fill 18 acts as an insulator during both low and high temperature applications. Additionally, the foam fill 18 enhances the permeation-barrier capability and reduces the phenomenon of cryopumping in the honeycomb sandwich panel. Foam fill 18 also acts to increase the shear and compressive strength of the honeycomb sandwich panel 10. Foam fill 18 may include Styrofoam, polystyrene foam, or any other suitable foam fill material commonly known to those in the art and those yet-to-be developed. According to one embodiment, foam fill 18 may include TEK or other resins or epoxies. Foam fill 18 may also include an epoxy. The epoxy resin or foam acts to adhere foam fill 18 to the walls of the honeycomb cell 20.

Foam fill 18 is disposed within honeycomb core 12 such that each cell 20 is only partially filled. Although the central portion of each cell 20 includes foam fill 18, the portion of the cell walls on each end cell 20 that extends beyond foam fill 18 defines gap regions 22. According to one embodiment, each cell 20 includes a first gap region 22 proximate to the first skin 14 and a second gap region 22 proximate to the second skin 16. Partially filling honeycomb cells 20 such that each cell includes gap regions 22 increases the compressive and shear strengths of honeycomb sandwich panel 10 without decreasing the flat-wise tension strength or thermal conductivity of the honeycomb sandwich panel 10. Thus, first and second gap regions 22 may substantially prevent the separation of the first and second skins 14 and 16, respectively, from the honeycomb core 12.

Figure 2:
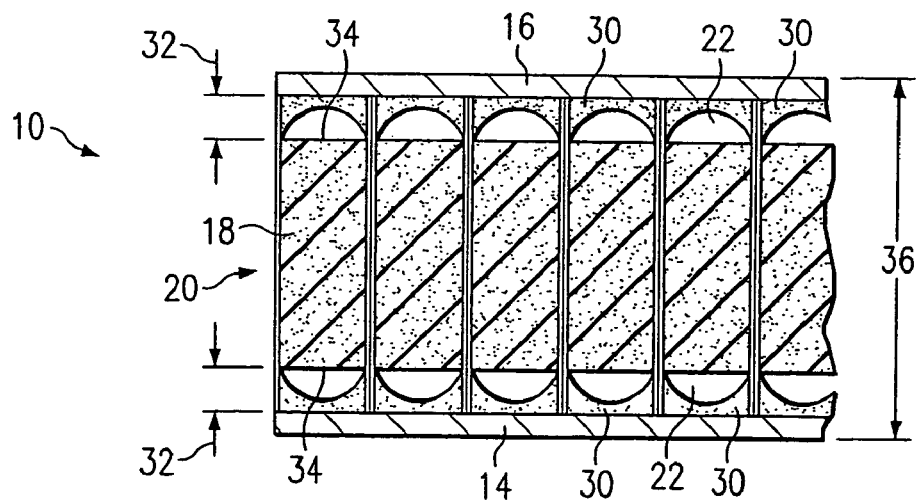
FIG. 2 is a profile view of a portion of a honeycomb sandwich panel in accordance with one embodiment of the present invention.

FIG. 2 is a profile view of a portion of a honeycomb sandwich panel 10 in accordance with one embodiment of the present invention. The portion shown includes multiple parallel cells 20 extending longitudinally between first and second skins 14 and 16. The first and second skins 14 and 16 are adhered to opposite ends of the cells 20 by an adhesive fillet 30. Each cell 20 includes a foam fill 18 surrounded on each end by a gap region 22. Partially filled cells 20 improve the structural and thermal properties of honeycomb sandwich panel 10 while gap regions 22 and fillets 30 prevent a substantial decrease in the panel's tensile strength.

First and second skins 14 and 16 are adhered to opposite surfaces of the honeycomb core 12 with an adhesive such that the honeycomb core is sandwiched between the first and second skins 14 and 16. The adhesive may include any appropriate adhesive for adhering the first and second skins 14 and 16 to the honeycomb core 12. Thus, the materials used in constructing the honeycomb core 12 and/or the first and second skins 14 and 16 may determine the type of adhesive used. Where, as described above, foam fill 18 also includes an epoxy in the composite material, the epoxy adhering the first and second skins 14 and 16 to the honeycomb core 12 may or may not be the same as the epoxy included in foam fill 18.

In the illustrated embodiment, the adhesive used to adhere the first and second skins 14 and 16 to opposite surfaces of the honeycomb core 12 forms an adhesive fillet 30. The adhesive fillet 30 partially fills the first and second gap regions 22. The adhesive fillet 30 is typically concave relative to the first and second skins 14 and 16. Thus, adhesive fillet 30 forms a layer upon each of the first and second skins 14 and 16 such that the layer is thinner toward the center of each honeycomb cell 20. The adhesive fillet 30 also adheres to at least a portion of the walls of honeycomb cell 20 that are exposed within first and second gap regions 22. In operation, adhesive fillet 30 increases the bond between the first and second skins 14 and 16 and the honeycomb core 12. Accordingly, the flat-wise tensile strength of the honeycomb panel 10 is increased, and the first and second skins 14 and 16 are not easily separated from the honeycomb core 12.

The longitudinal length of first and second gap regions 22 is the distance between the first and second skins 14 and 16 and the honeycomb core 12, respectively. Thus, first gap region 22 has a height 32 measured longitudinally from the first skin 14 to a first end 34 of the honeycomb core 12. Similarly, second gap region 22 has a height 32 measured longitudinally from the second skin 16 to a second, opposite end 34 of the honeycomb core 12. Honeycomb sandwich panel 10 may be constructed such that the height 34 of each gap region 22 is substantially the same. Alternatively, the honeycomb sandwich panel 10 may also be constructed such that the first and second gap regions 22 are of different or varying heights 34.

According to particular embodiments, the height 34 of each gap region 22 is on the order of approximately 0.05 inches to 0.125 inches. The height 34 of gap regions 22 remains constant regardless of the dimensions of honeycomb sandwich panel 10. Thus, regardless of whether the overall thickness of honeycomb sandwich panel 10 is one foot or twenty feet, the height 34 of each gap region 22 is the same. A height 34 on the order of approximately 0.05 inches to 0.125 inches may be desirable for the adequate formation of adhesive fillets 30. A height 34 on this order permits an adequate amount of adhesive to adhere to the walls of the honeycomb cells 20 that are exposed within each gap regions 22. As previously described, the formation of adhesive fillets 30 in gap regions 22 increases the bond between first and second skins 14 and 16 and the honeycomb core 12. Thus, the flat-wise tensile strength of the honeycomb sandwich panel 10 is increased without compromising the thermal and structural properties associated with the partially-filled honeycomb sandwich panel 10.

Figure 3A:
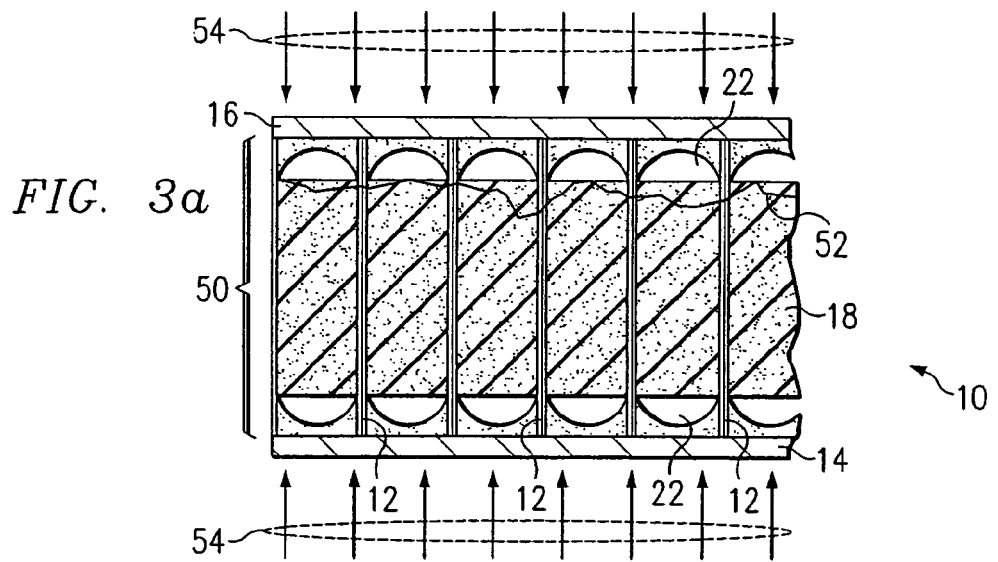
FIGS. 3a through 3c are graphical illustrations of the improved tensile, compressive, and shear strengths of the honeycomb sandwich panel of FIG. 1 in accordance with one embodiment of the present invention.
Figure 3B:
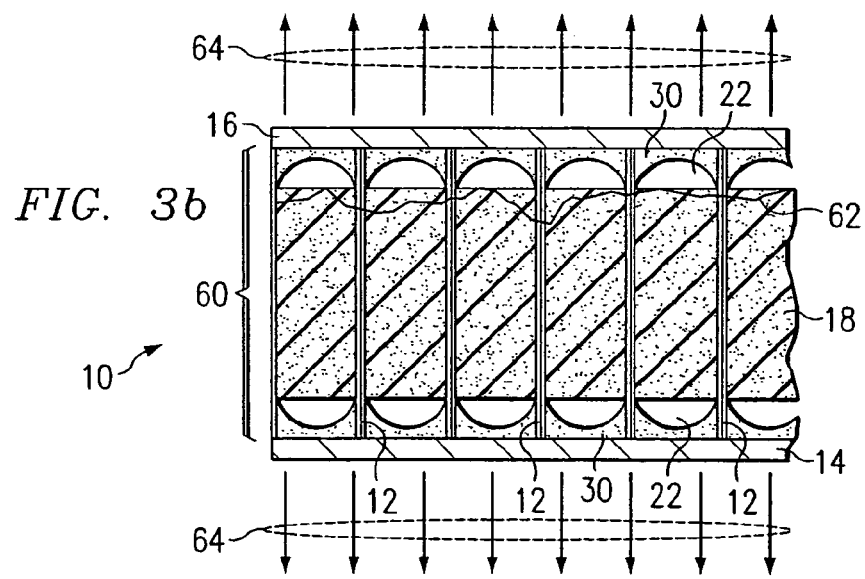
Figure 3C:
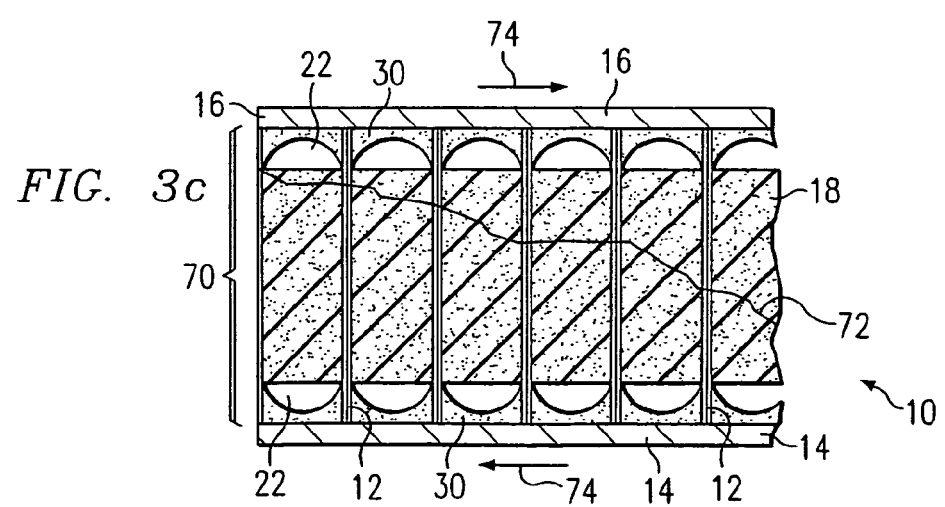

FIGS. 3a through 3c are graphical illustrations of the improved tensile, compression, and shear strengths of the honeycomb sandwich panel of FIG. 1. Foam fill 18 is typically included in honeycomb sandwich panel 10 to improve the thermal properties and compressive strength of the honeycomb panel 10. The inclusion of foam fill 18, however, diminishes the tensile strength of the honeycomb panel 10 when the cells are filled entirely with foam fill 18. In the illustrated embodiments, the honeycomb panel is constructed with gap regions 22 at the ends of each cell. The gap regions enable the adhesive used to bond the first and second skins 14 and 16 to the honeycomb core 12 to form adhesive fillets 30 within each gap region 22.

FIG. 3a illustrates the undiminished compressive strength of honeycomb panel 10 that is formed by partially filling cells 50 with foam fill 18. Failure line 52 indicates the points at which cells 50 fail when subjected to flatwise compression forces 54. The panel 10 fails when the walls of the honeycomb core 12 that form cells 50 are structurally compromised. For example, the walls of the honeycomb core 12, may crumple. The failure rate of partially filled cells 50 is substantially the same as the failure rate of cells that are filled entirely with foam fill 18. Thus, the first and second gap regions 22 do not substantially effect the thermal properties and compressive strength of honeycomb cells 60. Additionally, the compressive strength of the honeycomb panel 10 is improved as compared to the compressive strength of honeycomb panel that does not include foam fill 18 with in the honeycomb cells.

FIG. 3b illustrates the improved tensile strength of honeycomb panel 10 that is formed by partially filling cells 60 with foam fill 18. The failure line 62 indicates the points at which cells 60 fail when subjected to flatwise tension forces 64. The panel 10 fails when the bond between the first and second skins 14 and 16 and the first and second surfaces of the honeycomb core 12, respectively, are broken. The bond breaks when the adhesive fails to secure the first and second skins 14 and 16 to the honeycomb core 12 and the first and second skins 14 and 16 become separated from the honeycomb core 12. In the illustrated embodiment, the area in each cell 60 comprising first and second gap regions 22 provide space for the adhesive, which bonds the first and second skins 14 and 16 to the honeycomb core 12, to form an adhesive fillet 30. The adhesive fillets 30 in the gap regions 22 of each cell 60 decrease the rate at which the honeycomb sandwich panel 10 fails when compared to honeycomb panel that includes cells completely filled with foam fill 18.

FIG. 3c illustrates the improved plate shear strength of honeycomb panel 10 that is formed by partially filling cells 70 with foam fill 18. The failure line 72 indicates the points at which cells 70 fail when subjected to shear forces 74 in the ribbon direction of the panel 10. The panel 10 fails in ribbon shear when the bond between the first and second skins 14 and 16 and the first and second surfaces of the honeycomb core 12, respectively, are broken. The failure occurs diagonally through the thickness of the core of cells 70 through the foam filled core region. In the illustrated embodiment, the first and second gap regions 22 enable an adhesive fillet 30 to form. The adhesive fillets 30 in the gap regions 22 of each cell 70 decrease the rate at which the honeycomb sandwich panel 10 fails when compared to honeycomb panel that includes cells completely unfilled with foam fill 18.

Figure 4:
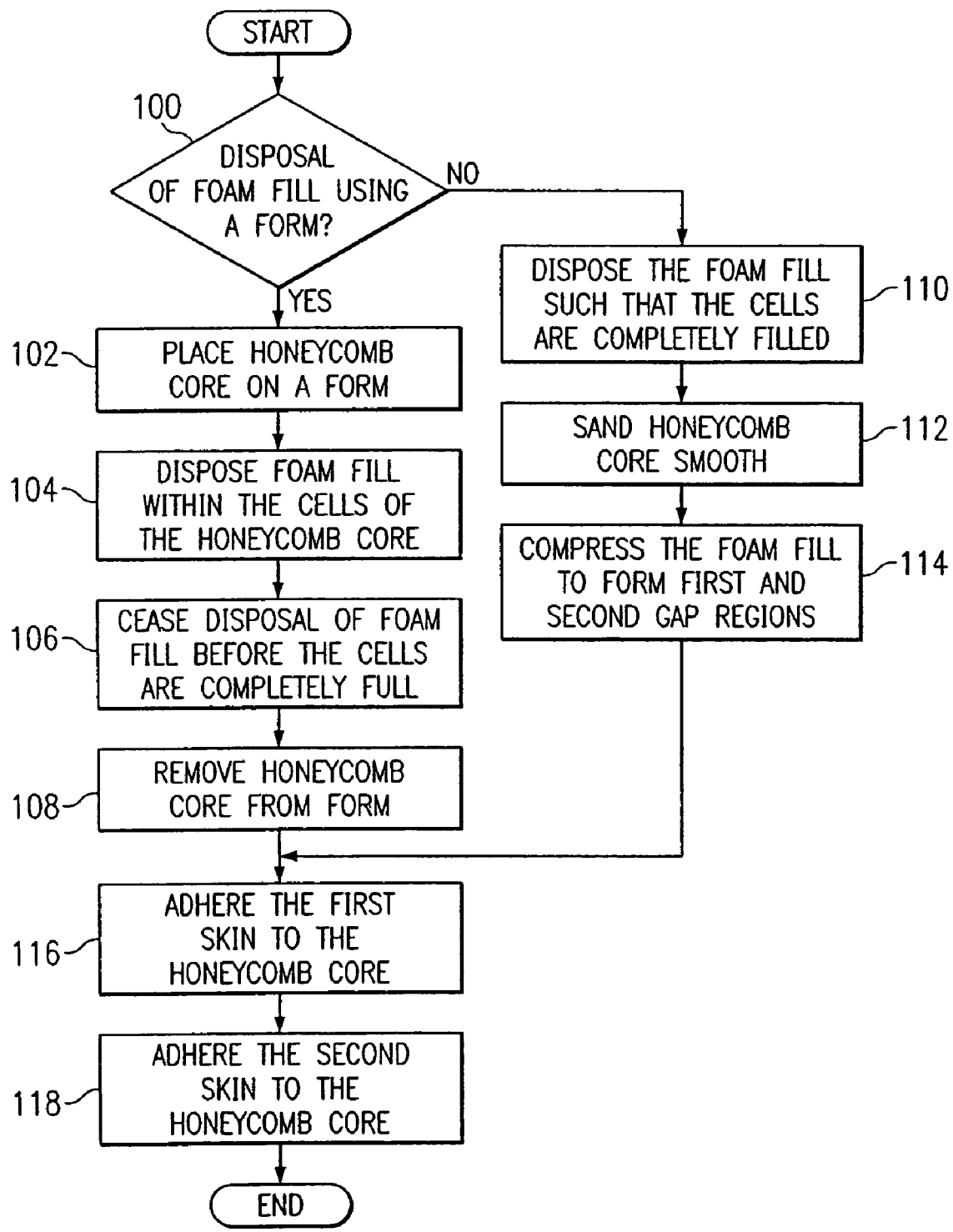
FIG. 4 is a flow diagram illustrating example methods for forming the honeycomb sandwich panel of FIG. 1.

FIG. 4 is a flow diagram illustrating example methods for forming the honeycomb sandwich panel of FIG. 1. The method begins at step 100 where it is determined whether a form will be used to create the partially filled honeycomb core 12. If a form is chosen for the disposal of foam fill 18, the honeycomb core is placed on the form at step 102. The form may be, for example, a bed of granular material placed in a tray or on a table. An example granular material includes sand. The granular material is of a sufficient depth as to fill a first end portion of each of the plurality of honeycomb cells 20 when honeycomb core 12 is placed in the bed of granular material. As another example, the form may include a plate or tray with pegs or other projections that are substantially the same shape and size as the cells 20 of honeycomb core 12. When the honeycomb core 12 is placed on the form, a peg substantially fills the end portion of each of the plurality of honeycomb cells 20.

Once removed from the form and the pegs or projections are removed from the cells 20, the end portion will form first gap region 22. Thus, the height of the peg or the depth of the granular material determines the height 32 of first gap region 22. If a height 32 on the order of approximately 0.05 to 0.125 inches is desired for the first gap region 22, the height of the peg or the depth of the granular material may also be on the order of approximately 0.05 to 0.125 inches. In particular embodiments, the peg or granular material filling the end portion of each cell 20 may be substantially the same height 32 or depth in all cells 20. As a result, the height 32 of the first gap regions 22 of cells 20 are substantially the same throughout the honeycomb core 12. Alternatively, the height of the pegs or depth of the granular material may be varied within a desired range. As a result, the height 32 of each first gap region 22 may vary for each cell 20 of the honeycomb core 12.

At step 104, foam fill 18 is disposed within the cells 20 of the honeycomb core 12. Foam fill 18 is supported within each cell 20 by the form material in the end portion of the cell 20. As a result, the first end portions of the plurality of cells 20 remain free of foam fill 18. At step 106, disposal of foam fill 18 is ceased before the remaining portion of the honeycomb cells 20 are completely filled. The disposal of the foam fill 18 may be ceased at a predetermined time or when the foam fill 18 reaches a predetermined level within the cells 20. The portion remaining free of the foam fill 18 forms a second end portion. This second end portion forms the second gap region 22, and the height of the second end portion determines the height of the second gap region 22. Thus, if a predetermined height on the order of approximately 0.05 to 0.125 inches is desired for the second gap region 22, the disposal of foam fill 18 may be ceased when approximately the second end portion of the cell 20 that remains unfilled with foam fill 18 is substantially this desired height.

Although steps 104 and 106 are described as including disposing foam fill 18 until foam fill 19 is of a predetermined height, it is generally recognized that any of many other suitable techniques may be used to form the foam-free second end portion that corresponds to second gap region 22. For example, foam fill 18 may be disposed within the cells 20 of the honeycomb 12 until the foam fill 18 is substantially flush with the end 34 of the honeycomb core 12. After disposal of the foam fill 18, the honeycomb core may be machined or sanded to remove any excess foam fill 18 material that protrudes form the surface of the honeycomb core 12. The foam fill 18 may then be compressed within the honeycomb core 12 to form the second end portions. In an alliterative method, foam fill 18 may be scooped from each cell 20 of honeycomb core 12 to form the second end portions. Regardless of the method used to form second gap regions 22, the partially filled honeycomb core 12 is removed from the form at step 108. When removed from the form, the first and second end portions of each cell 20 form the first and second gap regions 22, respectively. The method then continues at step 116, as described below.

Returning to step 100, if no form is chosen for the disposal of foam fill 18, the foam fill 18 may be disposed in each honeycomb cell 20 such that the cells 20 are completely filled with foam fill 18 at step 110. At step 112, the honeycomb core 12 is sanded or machined smooth. Sanding or machining the surfaces of the honeycomb core 12 removes any excess foam fill 18 material that protrudes from the surface of the honeycomb core 12 and results in level surfaces to which first and second skins may be adhered. At step 114, foam fill 18 within each cell 20 is compressed to form the first and second gap regions 22 at each end of cell 20. The amount of force used to compress foam fill 18 or the length of time under which foam fill 18 is compressed may depend on the properties of the foam fill 18 material. Additionally, the amount of compression force or the length of time for compressing the foam fill 18 may be adjusted to obtain first and second gap regions 22 of a desired height 32. For example, it may be desirable that the first and second gap regions 22 are a predetermined height 32. For example, foam fill 18 may be compressed to obtain first and second gap regions 22 of a height 32 on the order of approximately 0.05 to 0.125 inches as measured longitudinally from the end 34 of foam fill 18 to the first and second gap regions 22, respectively. In particular embodiments, the height 32 of first and second gap regions 22 is on the order of approximately 0.05 to 0.125 inches regardless of the overall thickness of the honeycomb sandwich panel 10.

Although the formation of first and second gap regions 22 is described above as including completely filling cell 20 and then compressing the foam fill 18 within the cells 20, it is generally understood that first and second gap regions 22 may be formed using any of many other suitable techniques. For example, rather than compressing foam fill 18, step 114 may include scooping foam fill 18 from each cell 20 using an appropriate tool or machine. In this manner, as much foam fill 18 may be removed as desired to form first and second gap regions of a desired height 34. Thus, in particular embodiments a sufficient amount of foam fill 18 may be scooped from each cell 20 to form first and second gap regions 22 of a height 34 on the order of approximately 0.05 to 0.125 inches. It is recognized that gap regions 22 may be formed using any other suitable technique for forming a partially filled honeycomb sandwich panel 10.

As another example method of forming first and second gap regions 22, end pieces comprised of pre-cured foam may be placed in the end regions of each cell 20. If, as in particular embodiments, a gap region 22 of a height 34 on the order of approximately 0.05 to 0.125 inches is desired, each end piece may have a corresponding height of approximately 0.05 to 0.125 inches. Foam fill 18 is then disposed within the remaining portions of the honey comb cells 20. After foam fill 18 expands to substantially fill the remaining portions of the honey comb cells 20 and cures, the end pieces may be removed from cells 20 to form first and second gap regions 22.

Regardless of the technique used to form first and second gap regions 22, a first skin 14 is adhered to the first surface of the honeycomb core 12 at step 116. The first skin 14 may be adhered to the honeycomb core 12 using an epoxy or other adhesive suitable for adhering the materials of the first and second skins 14 and 16 to the honeycomb 12. At step 118, a second skin 16 is similarly adhered to the second surface of the honeycomb core 12. In adhering the first and second skins 14 and 16 to the honeycomb core 12, the adhesive may form multiple adhesive fillets 30 that each partially fill the first and second gap regions 22. As was described above with regard to FIG. 2, the adhesive fillet 30 forms a layer upon each of the first and second skins 14 and 16. The layer may be thinner toward the center of each honeycomb cell 20 and include legs of adhesive material adhered to a portion of the walls of honeycomb core 12 that divide cells 20. Thus, the adhesive fillet 30 may adhere to the portion of the walls of cells 20 that are exposed within the first and second gap regions 22. The adhesive fillet 30 increases bonding between the first and second skins 14 and 16 and the honeycomb core 12. Accordingly, the flat-wise tensile strength of the honeycomb panel 10 is increased such that the first and second skins 14 and 16 are not easily pulled away from the honeycomb core 12. After adherence of the second skin 16 to the honeycomb core 12, the method of forming a sandwich panel 10 terminates.

Although the present invention has been described with several embodiments, various changes and modifications may be suggested to one skilled in the art. It is intended that the present invention encompass such changes and modifications as fall with in the scope of the appended claims.

What is claimed is:

1. A method for forming a sandwich panel comprising:
disposing a foam fill within a plurality of cells of a honeycomb core until said foam fill is of a predetermined height, the foam fill and the honeycomb core defining a first gap region and a second gap region within each cell, the first gap region proximate to a first surface of the honeycomb core, the second gap region proximate to a second surface of the honeycomb core;
adhering a first skin to the first surface of the honeycomb core with an adhesive; and
adhering a second skin to the second surface of the honeycomb core with the adhesive to form a panel, the panel having a surface area of at least 2.25 square feet;
wherein disposing the foam fill within the cells of the honeycomb core comprises:
placing the honeycomb core on a form so as to fill a first end portion of each of the plurality of cells;
disposing the foam fill within the cells of the honeycomb core, the foam fill supported by the form such that the first end portion remains free of the foam fill; ceasing to dispose the foam fill before the cells are completely full such that a second end portion is free of foam fill; and
removing the honeycomb core from the form, the first end portion forming the first gap region, the second end portion forming the second gap region.

2. The method of claim 1, wherein the first gap region has a height of approximately 0.05 to 0.125 inches, the height being measured longitudinally from a first end of the foam fill to the first skin.

3. The method of claim 1, wherein the second gap region has a height of approximately 0.05 to 0.125 inches, the height being measured longitudinally from a second end of the foam fill to the second skin.

4. The method of claim 2, wherein the honeycomb core is comprised of a fiber and resin composite.

5. The method of claim 1, wherein the honeycomb core is comprised of a metallic composite.

6. The method of claim 1, wherein the honeycomb core is comprised of a non-metallic composite.

7. The method of claim 1, wherein the foam fill comprises a closed cell resin matrix.

8. The method of claim 1, wherein the foam fill acts as an insulator preventing the transfer of heat or cold through the sandwich panel.

9. The method of claim 1, wherein adhering the first and second skins to the first and second sides of the honeycomb core, respectively, comprises forming an adhesive fillet at least partially filling each of the plurality of first and second gap regions.

* * * * *